(12) United States Patent
Li

(10) Patent No.: US 8,827,436 B2
(45) Date of Patent: Sep. 9, 2014

(54) FIXER INKS FOR USE WITH INK JET INKS

(75) Inventor: Xiaoqing Li, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 46 days.

(21) Appl. No.: 13/638,982

(22) PCT Filed: May 27, 2011

(86) PCT No.: PCT/US2011/038280
§ 371 (c)(1),
(2), (4) Date: Oct. 2, 2012

(87) PCT Pub. No.: WO2011/150301
PCT Pub. Date: Dec. 1, 2011

(65) Prior Publication Data
US 2013/0027451 A1    Jan. 31, 2013

Related U.S. Application Data

(60) Provisional application No. 61/348,844, filed on May 27, 2010.

(51) Int. Cl.
*B41J 2/01* (2006.01)
*C09D 11/54* (2014.01)
*B41J 2/21* (2006.01)
*C09D 11/30* (2014.01)

(52) U.S. Cl.
CPC ............... *C09D 11/54* (2013.01); *B41J 2/2107* (2013.01); *C09D 11/30* (2013.01)
USPC ............... 347/100; 347/96; 347/95

(58) Field of Classification Search
USPC ......... 347/100, 95, 96, 101, 102, 105, 20, 21; 106/31.6, 31.27, 31.13; 523/160, 161
See application file for complete search history.

(56) References Cited

U.S. PATENT DOCUMENTS

| | | | |
|---|---|---|---|
| 3,479,310 A | 11/1969 | Otto et al. | |
| 4,108,814 A | 8/1978 | Reiff et al. | |
| 4,269,748 A | 5/1981 | Nachtkamp et al. | |
| 4,408,008 A | 10/1983 | Markusch et al. | |
| 4,829,122 A | 5/1989 | Pedain et al. | |
| 5,022,592 A | 6/1991 | Zakheim et al. | |
| 5,026,427 A | 6/1991 | Mitchell et al. | |
| 5,085,698 A | 2/1992 | Ma et al. | |
| 5,231,131 A | 7/1993 | Chu et al. | |
| 5,310,778 A | 5/1994 | Shor et al. | |
| 5,554,739 A | 9/1996 | Belmont | |
| 5,571,311 A | 11/1996 | Belmont et al. | |
| 5,609,671 A | 3/1997 | Nagasawa | |
| 5,672,198 A | 9/1997 | Belmont | |
| 5,698,016 A | 12/1997 | Adams et al. | |
| 5,707,432 A | 1/1998 | Adams et al. | |
| 5,718,746 A | 2/1998 | Nagasawa | |
| 5,747,562 A | 5/1998 | Mahmud et al. | |
| 5,749,950 A | 5/1998 | Mahmud et al. | |
| 5,803,959 A | 9/1998 | Johnson et al. | |
| 5,837,045 A | 11/1998 | Johnson et al. | |
| 5,851,280 A | 12/1998 | Belmont et al. | |
| 5,861,447 A | 1/1999 | Nagasawa et al. | |
| 5,864,307 A | 1/1999 | Henley | |
| 5,885,335 A | 3/1999 | Adams et al. | |
| 5,891,231 A | 4/1999 | Guerlich et al. | |
| 5,895,522 A | 4/1999 | Belmont et al. | |
| 5,922,118 A | 7/1999 | Johnson et al. | |
| 5,928,419 A | 7/1999 | Uemura et al. | |
| 5,976,232 A | 11/1999 | Gore | |
| 5,976,233 A | 11/1999 | Osumi et al. | |
| 6,057,384 A | 5/2000 | Nguyen et al. | |
| 6,099,632 A | 8/2000 | Nagasawa et al. | |
| 6,117,921 A | 9/2000 | Ma et al. | |
| 6,123,759 A | 9/2000 | Mise et al. | |
| 6,153,001 A | 11/2000 | Suzuki et al. | |
| 6,221,141 B1 | 4/2001 | Takada et al. | |
| 6,221,142 B1 | 4/2001 | Wang et al. | |
| 6,221,143 B1 | 4/2001 | Palumbo | |
| 6,262,152 B1 | 7/2001 | Fryd et al. | |
| 6,277,183 B1 | 8/2001 | Johnson et al. | |
| 6,281,267 B2 | 8/2001 | Parazak | |
| 6,306,994 B1 | 10/2001 | Donald et al. | |
| 6,329,446 B1 | 12/2001 | Sacripante et al. | |
| 6,332,919 B2 | 12/2001 | Osumi et al. | |
| 6,375,317 B1 | 4/2002 | Osumi et al. | |
| 6,433,117 B1 | 8/2002 | Ma et al. | |
| 2001/0035110 A1 | 11/2001 | Kato | |
| 2003/0089277 A1 | 10/2002 | Miller | |
| 2003/0137574 A1 | 7/2003 | Wang et al. | |
| 2006/0023044 A1* | 2/2006 | Bauer | 347/100 |
| 2006/0110552 A1 | 5/2006 | Ishida et al. | |
| 2006/0251831 A1 | 11/2006 | Nishikawa et al. | |
| 2006/0293410 A1 | 12/2006 | Tokita et al. | |
| 2008/0092309 A1* | 4/2008 | Ellis et al. | 8/478 |
| 2009/0087565 A1 | 4/2009 | Houjou | |
| 2009/0169762 A1 | 7/2009 | Szajewski et al. | |
| 2011/0032303 A1* | 2/2011 | Li | 347/20 |

FOREIGN PATENT DOCUMENTS

| | | |
|---|---|---|
| EP | 0556649 A1 | 6/1999 |
| EP | 1114851 A1 | 7/2001 |
| EP | 1122286 A4 | 7/2003 |
| EP | 1158030 B1 | 9/2006 |
| EP | 1167471 B1 | 6/2008 |
| WO | 01/10963 A1 | 2/2001 |
| WO | 01/25340 A1 | 4/2001 |
| WO | 01/94476 A3 | 5/2002 |

OTHER PUBLICATIONS

Corresponding case PCT/US 11/38280 International Search Report, dated Sep. 8, 2011.

* cited by examiner

*Primary Examiner* — Manish S Shah
(74) *Attorney, Agent, or Firm* — Simon L. Xu

(57) ABSTRACT

This disclosure provides an ink jettable fixer ink including a water soluble or water dispersible amphoteric polymer, wherein the amphoteric polymer contains both a cationic charge and an anionic charge within the same molecule, wherein the mole ratio of cationic charge to anionic charge is greater than 1; wherein the ink jettable fixer ink does not contain a colorant; and wherein the amphoteric polymer forms a water insoluble solid precipitate when mixing with an anionic charged ink jet ink. These fixer inks when used with aqueous colorant containing ink jet inks give improved optical density and chroma.

21 Claims, No Drawings

FIXER INKS FOR USE WITH INK JET INKS

CROSS REFERENCE TO RELATED APPLICATIONS

This application claims priority under 35 U.S.C. §119 from U.S. Provisional Application Ser. No. 61/348,844, filed May 27, 2010.

BACKGROUND OF THE DISCLOSURE

This disclosure relates to a fixer (fixing) ink containing water soluble or water dispersible amphoteric polymer for use with ink jet inks containing colorants. The disclosure also relates to a method of inkjet printing with this ink set.

Inkjet printing is a non-impact printing process in which droplets of ink are deposited on print media, such as paper, to form the desired image. The droplets are ejected from a printhead in response to electrical signals generated by a microprocessor.

Both dyes and pigments have been used as colorants for inkjet inks. While dyes are typically easier to formulate compared to pigments, they tend to fade quickly and are more prone to rub off. Inks comprising pigments dispersed in aqueous media are advantageously superior to inks using water-soluble dyes in water-fastness and light-fastness of printed images.

Pigments suitable for aqueous inkjet inks are in general well-known in the art. Traditionally, pigments were stabilized by dispersing agents, such as polymeric dispersants or surfactants, to produce a stable dispersion of the pigment in the vehicle. More recently though, so-called "self-dispersible" or "self-dispersing" pigments (hereafter "SDP") have been developed. As the name would imply, SDPs are dispersible in water without dispersants.

One disadvantage of inkjet printers is the relatively slow speed compared to, for example, laser printers. The slow speeds are due in large part to the relatively slow dry time of inkjet inks as well as slow-down due to bleed control algorithms in the printer software.

Among the proposed solutions to increase print speeds is the formulation of inks for "fast drying" by inclusion of ingredients such as surfactants or other penetrants. These ingredients can indeed improve dry times by absorbing rapidly into the paper and in certain formulations reduce bleed, but usually cause edge acuity and optical density (OD) to decrease.

A fixer ink applied prior to the ink or right after the ink can be used to precipitate colorant and polymer contained in the ink, so that the precipitated colorants can stay or deposit on the paper surface, results in higher OD and better chroma.

A need still exists for an ink jettable fixer ink that is stable in a wide pH range and one that jets reliably allowing increased printing speeds while maintaining good print quality.

SUMMARY OF THE DISCLOSURE

An embodiment of the invention provides an ink jettable fixer ink comprising a water soluble or water dispersible amphoteric polymer, wherein the amphoteric polymer comprises both a cationic charge and an anionic charge within the same molecule, wherein the mole ratio of cationic charge to anionic charge is greater than 1; wherein the ink jettable fixer ink does not contain a colorant; and wherein the amphoteric polymer forms a water insoluble solid precipitate when mixing with an anionic charged ink jet ink.

Another embodiment provides that the water soluble or water dispersible amphoteric polymer is selected from the group consisting of an amphoteric vinyl copolymer, an amphoteric polyurethane polymer and mixtures thereof.

Another embodiment provides that the water soluble or water dispersible amphoteric polymer is prepared by copolymerizing reactants comprising a cationic salt forming group and reactants comprising an anionic salt forming group, and optionally, at least one neutral reactant.

Another embodiment provides that the ratio of the number of reactants with cationic salt forming groups and the number of reactants with anionic salt forming groups is greater than one.

Another embodiment provides that the amphoteric polymer has a number average molecular weight ranging from 3,000 to 80,000.

Another embodiment provides that the amphoteric polymer is treated with a neutralizing agent or quaternizing agent.

Another embodiment provides that the amount of amphoteric polymer ranges from about 0.05 to about 20% by weight, based on the total weight of the fixer ink.

Another embodiment provides an ink set comprising an aqueous colorant containing ink jet ink having an anionic charge and an ink jettable fixer ink comprising a water soluble or water dispersible amphoteric polymer, wherein the amphoteric polymer comprises both a cationic charge and an anionic charge within the same molecule, wherein the mole ratio of cationic charge to anionic charge is greater than 1; and wherein the amphoteric polymer forms water insoluble solid precipitate when mixing with an aqueous colorant containing ink jet ink having an anionic charge.

Another embodiment provides that the colorant containing ink jet ink comprises a colorant and an aqueous vehicle.

Another embodiment provides that the colorant comprises a pigment dispersion, SDP or dye.

Another embodiment provides that the aqueous vehicle comprises water and at least one water soluble organic solvent.

Another embodiment provides a method of ink jet printing onto a substrate comprising, in any workable order, the steps of:

(a) providing an ink jet printer that is responsive to digital data signals;

(b) loading the printer with a substrate to be printed;

(c) loading the printer with an ink set comprising an aqueous colorant containing ink jet ink having an anionic charge and an ink jettable fixer ink comprising a water soluble or water dispersible amphoteric polymer, wherein the amphoteric polymer comprises both a cationic charge and an anionic charge within the same molecule, wherein the mole ratio of cationic charge to anionic charge is greater than 1; and wherein the amphoteric polymer forms water insoluble solid precipitate when mixing with an aqueous colorant containing ink jet ink having an anionic charge; and (d) printing onto the substrate using the ink set, in response to the digital data signals to form a printed image on the substrate, wherein the ink jettable fixer ink may be applied to the substrate before or after the application of the aqueous colorant containing ink jet ink.

Another embodiment provides that the ink jettable fixer ink is applied before the aqueous colorant containing ink jet ink having an anionic charge.

Another embodiment provides that the volume of ink jettable fixer ink and aqueous colorant containing ink jet ink having an anionic charge is the same or less.

Another embodiment provides that the substrate is paper.

These and other features and advantages of the present invention will be more readily understood by those of ordinary skill in the art from a reading of the following detailed description. Certain features of the invention which are, for clarity, described above and below as a separate embodiment, may also be provided in combination in a single embodiment. Conversely, various features of the invention that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

In addition, references in the singular may also include the plural (for example, "a" and "an" may refer to one, or one or more) unless the context specifically states otherwise.

According to the present disclosure, an ink comprising a colorant, first aqueous vehicle, and optionally other additives well-known in the relevant art, is applied to a substrate in combination with a ink jettable fixer ink comprising an amphoretic polymer, second aqueous vehicle and optionally other additives well-known in the relevant art. The ink jettable fixer ink is most commonly designed to operate by electrostatic interaction with the colorant. This process is sometimes referred to in the art as "insolubilizing", "precipitating" or "crashing" the colorant. The ink jettable fixer ink is used in combination with aqueous colorant containing ink jet inks to give images that have enhanced coloristic properties. It may also have other additional unspecified beneficial effects. Typically, the ink jettable fixer ink is applied to the substrate first and then the ink is printed on top of the applied fixer ink. To minimize the liquid load on the substrate, the fixer ink(s) are typically formulated to be effective at volumes equal to or less than the volume of colored ink being fixed. Typically, although not necessarily, the drop volume of the fixer ink(s) will be the same as the colored ink(s) and thus, typically, there will be no more than about one drop of fixer ink for each drop of colored ink. Fixer inks are generally also substantially colorless and do not perceptibly or substantially change the hue of a colored ink being fixed.

As described herein after, the ink jettable fixer ink need not fill the entire printed area to be effective. In fact, the area filled by the fixer can be a fraction of the area covered by the ink, as discussed in further detail below.

Aqueous Colorant Containing Ink Jet Ink

Aqueous ink jet inks comprise a colorant, and an aqueous vehicle and optionally other additives well-known in the relevant art. The colorant may be a pigment dispersion, "self dispersed", "self-dispersible" or "self-dispersing" pigment (hereafter "SDP") or a dye. Dyes include disperse dyes, reactive dyes, acid dyes and the like. Typically, the pigment dispersion is an anionically stabilized pigment dispersion.

Suitable pigments are those generally well-known in the art for aqueous ink jet inks Traditionally, pigments are stabilized by dispersing agents, such as polymeric dispersants or surfactants, to produce a stable dispersion of the pigment in the vehicle. More recently though, SDPs have been developed. As the name would imply, SDPs are dispersible in water without dispersants. Dispersed dyes are also considered pigments as they are insoluble in the aqueous inks used herein.

The dispersant or surface treatment applied to the pigment creates an anionic surface charge ("anionic pigment dispersion"). Typically, that surface charge is imparted predominately by ionizable carboxylic acid (carboxylate) groups.

The pigment dispersions, wherein pigments are stabilized by addition of dispersing agents, may be prepared by methods known in the art. It is generally desirable to make the stabilized pigment in a concentrated form. The stabilized pigment is first prepared by premixing the selected pigment(s) and polymeric dispersant(s) in an aqueous carrier medium (such as water and, optionally, a water-miscible solvent), and then dispersing or deflocculating the pigment. The dispersing step may be accomplished in a 2-roll mill, media mill, a horizontal mini mill, a ball mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the polymeric dispersant and the pigment under pressure. The media for the media mill is chosen from commonly available media, including zirconia, YTZ and nylon. These various dispersion processes are in a general sense well known in the art, as exemplified by U.S. Pat. No. 5,022,592, U.S. Pat. No. 5,026,427, U.S. Pat. No. 5,310,778, U.S. Pat. No. 5,891,231, U.S. Pat. No. 5,976, 232 and US20030089277. Typical are 2-roll mill, media mill, and by passing the mixture through a plurality of nozzles within a liquid jet interaction chamber at a liquid pressure of at least 5,000 psi.

After the milling process is complete, the pigment concentrate may be "let down" into an aqueous system. "Let down" refers to the dilution of the concentrate with mixing or dispersing. The intensity of the mixing/dispersing is normally determined by trial and error using routine methodology and is often dependent on the combination of the polymeric dispersant, solvent and pigment.

The dispersant used to stabilize the pigment is typically a polymeric dispersant. Either structured or random polymers may be used, although structured polymers are preferred for use as dispersants for reasons well known in the art. The term "structured polymer" means polymers having a block, branched or graft structure. Examples of structured polymers include AB or BAB block copolymers such as disclosed in U.S. Pat. No. 5,085,698; ABC block copolymers such as disclosed in EP-A-0556649; and graft polymers such as disclosed in U.S. Pat. No. 5,231,131. Other polymeric dispersants that can be used are described, for example, in U.S. Pat. No. 6,117,921, U.S. Pat. No. 6,262,152, U.S. Pat. No. 6,306, 994 and U.S. Pat. No. 6,433,117. Polymer dispersants suitable for use in the present disclosure comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl (meth)acrylate and salts thereof. Also quaternary salts of dimethylaminoethyl(meth)acrylate may be employed.

More recently though, so-called "self dispersed", "self-dispersible" or "self-dispersing" pigments (hereafter "SDP") have been developed. As the name would imply, SDPs are dispersible in water, or vehicle, without dispersants. See, for example, U.S. Pat. No. 5,554,739, U.S. Pat. No. 5,571,311, U.S. Pat. No. 5,609,671, U.S. Pat. No. 5,672,198, U.S. Pat. No. 5,698,016, U.S. Pat. No. 5,707,432, U.S. Pat. No. 5,718,746, U.S. Pat. No. 5,747,562, U.S. Pat. No. 5,749,950, U.S. Pat. No. 5,803,959, U.S. Pat. No. 5,837,045, U.S. Pat. No. 5,846,307, U.S. Pat. No. 5,851,280, U.S. Pat. No. 5,861,447, U.S. Pat. No. 5,885,335, U.S. Pat. No. 5,895,522, U.S. Pat. No. 5,922,118, U.S. Pat. No. 5,928,419, U.S. Pat. No. 5,976,233, U.S. Pat. No. 6,057,384, U.S. Pat. No. 6,099,632, U.S. Pat. No. 6,123,759, U.S. Pat. No. 6,153,001, U.S. Pat. No. 6,221,141, U.S. Pat. No. 6,221,142, U.S. Pat. No. 6,221,143, U.S. Pat. No. 6,277,183, U.S. Pat. No. 6,281,267, U.S. Pat. No. 6,329,446, U.S. Pat. No. 6,332,919, U.S. Pat. No. 6,375,317, US2001/0035110, EP-A-1086997, EP-A-1114851, EP-A-1158030, ep-a-1167471, ep-a-1122286, wo01/10963, wo01/25340 and wo01/94476.

A pigment may be stabilized to dispersion by surface treatment to be self-dispersing (see, for example, WO 01/94476), by treatment with dispersant in the traditional way, or by some combination of surface treatment and dispersant.

Some representative commercial pigments in dry form include the following:

| Trade name | Manufacturer | Color index (ci) Pigment name |
|---|---|---|
| Permanent yellow dhg | Hoechst | Yellow 12 |
| Permanent yellow gr | Hoechst | Yellow 13 |
| Permanent yellow g | Hoechst | Yellow 14 |
| Permanent yellow ncg-71 | Hoechst | Yellow 16 |
| Permanent yellow ncg-71 | Hoechst | Yellow 16 |
| Permanent yellow gg | Hoechst | Yellow 17 |
| Hansa yellow ra | Hoechst | Yellow 73 |
| Hansa brilliant yellow 5gx-02 | Hoechst | Yellow 74 |
| Dalamar ® yellow yt-858-d | Heubach | Yellow 74 |
| Hansa yellow x | Hoechst | Yellow 75 |
| Novoperm ® yellow hr | Hoechst | Yellow 83 |
| Chromophtal ® yellow 3g | Ciba-geigy | Yellow 93 |
| Chromophtal ® yellow gr | Ciba-geigy | Yellow 95 |
| Novoperm ® yellow fgl | Hoechst | Yellow 97 |
| Hansa brilliant yellow 10gx | Hoechst | Yellow 98 |
| Permanent yellow g3r-01 | Hoechst | Yellow 114 |
| Chromophtal ® yellow 8g | Ciba-geigy | Yellow 128 |
| Irgazin ® yellow 5gt | Ciba-geigy | Yellow 129 |
| Hostaperm ® yellow h4g | Hoechst | Yellow 151 |
| Hostaperm ® yellow h3g | Hoechst | Yellow 154 |
| L74-1357 yellow | Sun chem | |
| L75-1331 yellow. | Sun chem | |
| L75-2377 yellow | Sun chem. | |
| Hostaperm ® orange gr | Hoechst | Orange 43 |
| Paliogen ® orange | Basf | Orange 51 |
| Irgalite ® rubine 4bl | Ciba-geigy | Red 57:1 |
| Quindo ® magenta | Mobay | Red 122 |
| Indofast ® brilliant scarlet | Mobay | Red 123 |
| Hostaperm .rtm. Scarlet go | Hoechst | Red 168 |
| Permanent rubine f6b | Hoechst | Red 184 |
| Monastral ® magenta | Ciba-geigy | Red 202 |
| Heliogen .rtm. Blue l 6901f | Basf | Blue 15:2 |
| Heliogen ® blue nbd 7010 | Basf | |
| Heliogen ® blue k 7090 | Basf | Blue 15:3 |
| Heliogen ® blue l 7101f | Basf | Blue 15:4 |
| Paliogen ® blue l 6470 | Basf | Blue 60 |
| Heucophthal ® blue g, xbt-583d | Heubach | Blue 15:3 |
| Heliogen ® green k 8683 | Basf | Green 7 |
| Heliogen ® green l 9140 | Basf | Green 36 |
| Monastral ® violet r | Ciba-geigy | Violet 19 |
| Monastral ® red b | Ciba-geigy | Violet 19 |
| Quindo ® red r6700 | Mobay | |
| Quindo ® red r6713 | Mobay | |
| Indofast ® violet | Mobay | Violet 23 |
| Monastral ®. Violet maroon b | Ciba-geigy | Violet 42 |
| Special black 4a | Degussa | Black 7 |
| Sterling ® ns 76 black | Cabot | Black 7 |
| Sterling ® nsx 76 | Cabot | Black 7 |
| Mogul 1 | Cabot | Black 7 |

Some representative commercial pigments available in the form of a water-wet presscake include: Heucophthal® Blue BT-585-P, Toluidine Red Y (C.I. Pigment Red 3), Quindo® Magenta (Pigment Red 122), Magenta RV-6831 presscake (Mobay Chemical, Harmon Division, Haledon, N.J.), Sunfast® Magenta 122 (Sun Chemical Corp., Cincinnati, Ohio), Indo® Brilliant Scarlet (Pigment Red 123, C.I. No. 71145), Toluidine Red B (C.I. Pigment Red 3), Watchung® Red B (C.I. Pigment Red 48), Permanent Rubine F6B13-1731 (Pigment Red 184), Hansa® Yellow (Pigment Yellow 98), Dalamar® Yellow YT-839-P (Pigment Yellow 74, C.I. No. 11741, Sunbrite® Yellow 17 (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc. Black pigments, such as carbon black, generally are not available in the form of aqueous presscakes.

Some anionic dyes include Acid Yellow 11, Acid Yellow 17, Acid Yellow 23, Acid Yellow 25, Acid Yellow 29, Acid Yellow 42, Acid Yellow 49, Acid Yellow 61, Acid Yellow 71, Direct Yellow 12, Direct Yellow 24, Direct Yellow 26, Direct Yellow 44, Direct Yellow 86, Direct Yellow 87, Direct Yellow 98, Direct Yellow 100, Direct Yellow 130, Direct Yellow 86, Direct Yellow 132, Direct Yellow 142, Acid Red 1, Acid Red 6, Acid Red 8, Acid Red 32, Acid Red 35, Acid Red 37, Acid Red 51, Acid Red 52, Acid Red 80, Acid Red 85, Acid Red 87, Acid Red 92, Acid Red 94, Acid Red 115, Acid Red 180, Acid Red 254, Acid Red 256, Acid Red 289, Acid Red 315, Acid Red 317, Direct Red 1, Direct Red 4, Direct Red 13, Direct Red 17, Direct Red 23, Direct Red 28, Direct Red 31, Direct Red 62, Direct Red 79, Direct Red 81, Direct Red 83, Direct Red 89, Direct Red 227, Direct Red 240, Direct Red 242, Direct Red 243,Acid Blue 9, Acid Blue 22, Acid Blue 40, Acid Blue 59, Acid Blue 93, Acid Blue 102, Acid Blue 104, Acid Blue 113, Acid Blue 117, Acid Blue 120, Acid Blue 167, Acid Blue 229, Acid Blue 234, Acid Blue 254, Direct Blue 6, Direct Blue 22, Direct Blue 25, Direct Blue 71, Direct Blue 78, Direct Blue 86, Direct Blue 90, Direct Blue 106, Direct Blue 199.

The black colorant may also be a dye as, for example, the black dye disclosed in U.S. Pat. No. 5,753,016. The black colorant may also be a combination of dye and pigment as, for example, disclosed in U.S. Pat. No. 6,277,184.

Colorant Ink Aqueous Vehicle

"Aqueous vehicle" refers to water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Some representative examples of water-soluble organic solvents that may be selected are disclosed in U.S. Pat. No. 5,085,698.

If a mixture of water and a water-soluble solvent is used, the aqueous vehicle typically will contain about 30% to about 95% water with the balance (i.e., about 70% to about 5%)

being the water-soluble solvent. Typical compositions contain about 60% to about 95% water, based on the total weight of the aqueous vehicle.

The amount of aqueous vehicle in the ink is typically in the range of about 70% to about 99.8%, and typically about 80% to about 99.8%, based on total weight of the ink.

The aqueous vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are typically 1,2-C4-6 alkanediols, most typically 1,2-hexanediol. Some suitable surfactants include ethoxylated acetylene diols (e.g. Surfynol® E series from Air Products), ethoxylated primary (e.g. Neodo & commat series from Shell) and secondary (e.g. Tergitol® series from Union Carbide) alcohols, sulfosuccinates (e.g. Aerosol@ series from Cytec), organosilicones (e.g. Silwet®d3 series from Witco) and fluoro surfactants (e.g. Nonyl® series from DuPont).

The amount of glycol ether(s) and 1,2-alkanediol(s) added must be properly determined, but is typically in the range of from about 1 to about 15% by weight, and more typically about 2 to about 10% by weight, based on the total weight of the ink. Surfactants may be used, typically in the amount of about 0.01 to about 5% and more typically about 0.2 to about 2%, based on the total weight of the ink.

Other Ingredients:

Other ingredients may be formulated into the inkjet ink, to the extent that such other ingredients do not interfere with the stability and jettablity of the ink, which may be readily determined by routine experimentation. Such other ingredients are in a general sense well known in the art. Biocides may be used to inhibit growth of microorganisms. Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N",N"'-pentaacetic acid (DTPA), and glycoletherdiamine-N,N,N',N'-tetraacetic acid (GEDTA), and salts thereof, may be advantageous, for example, to eliminate deleterious effects of heavy metal impurities.

The colorant inks can contain compatible polymeric binders. Binders, if used, can be soluble or dispersed polymer(s) based on acrylic, urethane, polyester, polyamide, polyvinyl, polyether, polyamine and cellulosic structures. They can be any suitable polymer, for example, soluble polymers may include linear homopolymers, copolymers or block polymers, they also can be structured polymers including graft or branched polymers, stars, dendrimers, etc. The dispersed polymers can include latexes, polyurethane dispersions, etc. The polymers may be made by any known process including but not limited to free radical, group transfer, ionic, RAFT, condensation and other types of polymerization. When present, soluble polymer is advantageously used at levels, based on the final weight of ink, of at least 0.3% and typically at least about 0.6%. Upper limits are dictated by ink viscosity or other physical limitations. In a preferred embodiment, no more than about 15% soluble polymer is present in the ink, and even more typically no more than about 12%, based on the total weight of the ink.

Proportions of Ingredients:

The components described above and below may be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in an ink, whether aqueous or non-aqueous, is typically in the range of about 70% to about 99.8%, and more typically about 80% to about 99.8%, based on total weight of the ink.

In a colored ink, colorant will generally be present in amounts up to about 12%, and more typically in the range of about 0.1 to about 9%, by weight of the total ink. Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

Other ingredients (additives), when present, generally comprise less than about 15% by weight, based on the total weight of the ink surfactants, when added, are generally in the range of about 0.2 to about 3% by weight based on the total weight of the ink. Binder polymer can be added as needed, but will generally be less than about 15% by weight based on the total weight of the ink.

Fixer Ink

The fixer ink of the present disclosure, is an ink fluid comprising a water soluble or dispersible amphoteric polymer, typically selected from the group consisting of an amphoteric vinyl copolymer, an amphoteric polyurethane polymer and mixtures thereof. The amount of amphoteric polymer ranges from about 0.05 to about 20% by weight, based on the total weight of the fixer ink, typically from about 0.1% to about 15% by weight, more typically from about 1% to about 12% by weight, based on the total weight of the fixer ink. Typically, the ink jettable fixer ink does not contain a colorant.

Amphoteric Polymer

As used herein, the term "amphoteric" refers to a substance comprising both a cationic charge and an anionic charge within the same molecule. Typically, in useful amphoteric polymers the mole ratio of cationic charge to anionic charge is >1. The amphoteric polymer forms a water insoluble solid precipitate when mixing with anionic charged ink jet ink.

Water soluble or water dispersible amphoteric polymers are prepared by copolymerizing reactants with cationic salt forming groups and reactants with anionic salt forming groups, and optionally, one or more neutral reactants. Typically, the ratio of the number of reactant with cationic salt forming groups/reactant with anionic salt forming groups is greater than one. The amphoteric polymer's number average molecular weight ranges from about 3,000 to 80,000 and typically from 5,000 to 50,000. More typical polymers are chosen from amphoretic vinyl copolymers and amphoteric polyurethane copolymers.

Amphoteric Vinyl Copolymer

The amphoteric vinyl copolymer is prepared by copolymerizing cationic and anionic monomers and optionally, one or more neutral monomers. Typically, the ratio of the number of cationic salt forming monomer/anionic salt forming monomer is greater than one. Some examples of polymerization methods include but are not limited to free radical processes, Group Transfer Processes (GTP), Radical Addition Fragmentation (RAFT), Atom Transfer Reaction Polymerization (ATRP), and the like.

Typical monomers with cationic salt-forming groups include monomers with amino groups, tertiary amino groups and quaternary ammonium groups. Typical monomers with anionic salt-forming groups include monomers with acid groups selected from carboxylic acid, sulfonic acid and phosphoric acid groups.

Some examples of monomers that contain amino groups and tertiary amino groups include: diallylamine, methyldiallylamine, diallyldimethylamine, vinylpyridines such as vinylpyridine, 2-methyl-5-vinylpyridine, and 2-ethyl-5-vinyl-pyridine. (meth)acrylate esters containing a dialkylamino groups, such as N,N-dimethylaminoethyl(meth)acrylate, N,N-diethylaminoethyl(meth)acylate, N,N-dimethylaminopropyl(meth)acylate, and N,N-diethylaminopropyl(meth)acrylate. (meth)acrylamides containing a dialkylamino group, such as N—(N',N')-dimethylaminoethyl)(meth)acrylamide, N—(N',N'-diethylaminoethyl)-(meth)acrylamide, N—(N',N''-deimethylaminopropyl)(meth)acylamide, and N—(N',N'-diethylaminopropyl)(meth)acrylamide. Styrene containing a dialkylamino group, such as N,N-dimethylaminoethylstyrene, N,N-diethylaminostyreen, and N,N-diethylaminomethylstyrene. Vinyl ethers containing a dialkylamino group, such as 2-dimethylaminoethyl vinyl ether, 2-diethylaminoethyl vinyl ether, 2-dimethyl-aminopropyl vinyl ether, and 2-diethylaminopropyl vinyl ether.

Some examples of monomers containing a quaternary ammonium group include diallyldimethylammoniumchloride, methacryloylaminopropyltrimethlammonium chloride, methacryloyloxyethyltrimethylammonium chloride, methacryloyloxyethyltrimethylammonium methylsulfate, methacryloylaminopropyltrimethylammonium methylsulfate, methacryloxyloxyethyldimethylbenzylammonium chloride, methacryloyloxyethyltrimethylammonium p-toluenesulfonate, methacryloylaminopropydimethylbenxylammonium chloride, and methyacryloylamino-propyltrimethylammonium p-toluenesulfonate.

Some monomers with acid groups include, for example, acrylic acid, maleic acid, maleic acid monoester, itaconic acid, itaconic acid monoester, crotonic acid and crotonic acid monoester.

Neutral monomers include both hydrophobic and hydrophilic monomers. Some suitable ones include, for example, acrylamide, sulfur dioxide, hydroxyl(meth)acrylate, N-vinyloxazolidone, benzyl acrylate, butyl methacrylate and 2-phenylethyl methacrylate.

Amphoteric Polyurethanes

The amphoteric polyurethane is typically prepared by a multiple step process. Typically, in the first stage of prepolymer formation, a diisocyanate (NCO) is reacted with isocyanate reactive compounds having cationic salt forming groups, isocyanate reactive compounds having anionic salt forming groups, and optionally, isocyanate reactive compounds with no chargeable groups. The ratio of the number of isocyanate reactive compounds with cationic salt forming group/isocyanate reactive compounds with anionic groups is typically greater than one. Further, the total amount of cationic, ionic and nonionic functionality is greater than the minimum required to make the polymer dispersible or soluble in water. This intermediate polymer or pre-polymer from the first stage polymerization can be terminated with either an NCO-group or a NCO-reactive group. The terminal groups can be defined by the molar ratio of NCO to NCO-reactive groups in the prepolymer stage. Typically, the pre-polymer is an NCO-terminated material that is achieved by using a molar excess of NCO. In the second stage, the polyurethane can be prepared by chain extending the pre-polymer with polyamine chain extenders, which can optionally be partially or wholly blocked as disclosed in U.S. Pat. No. 4,269,748 and U.S. Pat. No. 4,829,122. Some sample polyamines include 1-amino-3-aminomethyl-3,5,5-trimethylcyclohexane (isophorone diamine or IPDA), bis-(4-amino-cyclohexyl)-methane, bis-(4-amino-3-methylcyclohexyl)-methane, 1,6-diaminohexane, hydrazine, ethylene diamine, diethylene triamine, triethylene tetramine, tetraethylene pentamine and pentaethylene hexamine. In some cases, chain termination may be desirable. This requires the addition, in most cases, of a mono-NCO reactive material such as a mono-amine or mono-alcohol. The amines or alcohols are generally aromatic, aliphatic or alicyclic and contain between 1 to 30, typically 2 to 15 and more typically 2 to 10 carbon atoms. These may contain additional substituents provided that they are not as reactive with isocyanate groups as the amine or alcohol groups.

Chain terminators and chain extenders can be used together, either as mixtures or as sequential additions to the NCO-prepolymer.

Some suitable diisocyanates are those that contain either aromatic, cycloaliphatic or aliphatic groups bound to the isocyanate groups. Mixtures of these compounds may also be used. Examples of suitable diisocyanates include cyclohexane-1,3- and -1,4-diisocyanate; 1-isocyanato-3-isocyanatomethyl-3,5,5-trimethyl-cyclohexane (isophorone diisocyanate or IPDI); bis-(4-isocyanato-cyclohexyl)-methane; 1,3- and 1,4-bis-(isocyanatomethyl)-cyclohexane; 1-isocyanato-2-isocyanatomethyl cyclopentane; 2,4'-diisocyanato-dicyclohexyl methane; bis-(4-isocyanato-3-methyl-cyclohexyl)-methane, alpha,alpha,alpha',-alpha'-tetramethyl-1,3- and/or -1,4-xylylene diisocyanate; 1-isocyanato-1-methyl-4 (3)-isocyanatomethyl cyclohexane; and 2,4- and/or 2,6-hexahydrotoluylene diisocyanate.

Some additional diisocyanates may be linear or branched and contain 4 to 12 carbon atoms, typically 4 to 9 carbon which include 1,4-tetramethylene diisocyanate; 1,6-hexamethylene diisocyanate; 2,2,4-trimethyl-1,6-hexamethylene diisocyanate; and 1,12-dodecamethylene diisocyanate. 1,6-hexamethylene diisocyanate and isophorone diisocyanate are examples of diisocyanates effective for the crosslinked polyurethanes Some examples of isocyanate reactive compound having cationic groups include isocyanate reactive compounds with tertiary amino groups and quaternary ammonium groups, for example, diethanol methyl amine and bis(hydroxyl-ethyl) dimethyl ammonium chloride. Some isocyanate reactive compounds having anionic groups include, for example, isocyanate reactive compounds with carboxylic acid groups, sulphonic acid groups, and phosphoric acid groups, Some suitable compounds for incorporating carboxyl groups are described in U.S. Pat. No. 3,479,310, U.S. Pat. No. 4,108,814 and U.S. Pat. No. 4,408,008. Some examples of carboxylic group-containing compounds are the hydroxy-carboxylic acids corresponding to the formula $(HO)_xQ(COOH)_y$, wherein Q represents a straight or branched, hydrocarbon radical containing 1 to 12 carbon atoms, x is 1 or 2 (more typically 2), and y is 1 to 3 (more typically 1 or 2). Some specific examples of these hydroxy-carboxylic acids include citric acid, tartaric acid and hydroxy-pivalic acid. Especially typical acids are those of the above-mentioned formula wherein x is 2 and y is 1. These dihydroxy alkanoic acids are described in U.S. Pat. No. 3,412,054. Especially typical dihydroxy alkanoic acids are the alpha,alpha-dimethylol alkanoic acids represented by the structural formula:

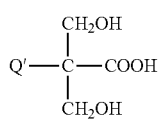

wherein Q' is hydrogen or an alkyl group containing 1 to 8 carbon atoms. The most typical compound is alpha, alpha-dimethylol propionic acid, i.e., wherein Q' is methyl in the above formula.

Some examples of isocyanate reactive compounds with no chargeable groups include hydrophilic compound with di-OH groups (hydrophilic polyol) and hydrophobic compound with di-OH groups (hydrophobic polyol). Hydrophilic polyol is a polyol having non-ionic dispersing groups and includes, for example, an alkylene oxide or polyoxyalkylene oxide segment, e.g., $-((CH_2)_nO)_m-$, wherein n can typically be from 2 to 4, and m can be from about 1 to about 400, typically from about 5 to about 200.

Some suitable hydrophobic polyols comprising at least two NCO reactive groups, which may be reacted to prepare the prepolymer, are those having a molecular weight of about 60 to about 6000. Among them, the polymeric polyols are best defined by the number average molecular weight, and can range from about 200 to about 6000, typically about 800 to about 3000, and more typically about 1000 to about 2500. The molecular weights are determined by hydroxyl group analysis (OH number). Some examples of these high molecular weight compounds include polyester, polyether, polycarbonates, polyacetals, poly(meth)acrylates, polyester amides, polythioethers or mixed polymers such as a polyester-polycarbonate where both ester and carbonate linkages are found in the same polymer. A combination of these polymers can also be used. Similar NCO reactive materials can be used as described for hydroxy containing compounds and polymers, but which contain other NCO reactive groups. Some examples would be dithiols, diamines, thioamines and even hydroxythiols and hydroxylamines. These can either be compounds or polymers with the molecular weights or number average molecular weights as described for the polyols.

In addition to the above-mentioned components, which are typically difunctional in the isocyanate polyaddition reaction, mono-functional and even small portions of trifunctional and higher functional components generally known in polyurethane chemistry, such as trimethylolpropane or 4-isocyanantomethyl-1,8-octamethylene diisocyanate, may be used in cases in which branching of the NCO prepolymer or polyurethane is desired. However, the NCO prepolymers should be substantially linear and this may be achieved by maintaining the average functionality of the prepolymer starting components at or below 2:1.

For both amphoteric vinyl copolymer and polyurethane, in order to enable the formation of cationic salts from amino or tertiary amine groups, and formation of anionic salt from acid groups, the neutralizing agent or quaternizing agent is added. Some examples of amine neutralizing agents include inorganic acids such as hydrochloric acid, sulfuric acid and phosphoric acid; and organic acids such as acetic acid, propionic acid, lactic acid, succinic acid, glycolic acid, gluconic acid and glyceric acid. Some examples of quaternizing agents include alkyl halides such as 2-bromopropane, 2-bromobutane 2-iodobutane; benzyl halides such as benzyl chloride and benzyl bromide; and dialkyl sulfates such as dimethyl sulfate and diethyl sulfate. Some suitable neutralizing agents for converting the acid groups to anionic salt groups include alkali metal cations, trialkyl-substituted tertiary amines, such as triethyl amine, tripropyl amine, dimethylcyclohexyl amine, dimethylethyl amine, and 4-methylmorpholine-oxide, substituted amines such as diethyl ethanol amine, diethanol methyl amine, tertiary amines. The conversion may take place after polymer synthesis or before the polymer synthesis at the monomer stage. The mole ratio of neutralizing agent or quaternizing agent over the reactants with cationic or anionic charge typically ranges from 70% to 100%, more typically at least 80%.

Other Ingredients

Fixer inks typically further comprise an aqueous vehicle and additives such as a surfactant. The "aqueous vehicle", also known as the second aqueous vehicle, is similar to the aqueous vehicle for the colored ink described earlier and comprises water or a mixture of water and at least one water-soluble organic solvent (co-solvent) described earlier. Some suitable surfactants include surfactants that are miscible with amphoteric polymers, i.e., those that do not form precipitates or aggregates when mixing. Some useful surfactants include cationic, non-ionic, and amphoteric surfactants. Some suitable cationic surfactants include, for example, quaternized ammonium or pyridinium surfactants, such as dodecyltrimethylammonium chloride, cetyltrimethylammonium bromide, cetyltrimethylpyridinium chloride and others. Some suitable non-ionic surfactants include ethoxylated acetylene diols (e.g. Surfynol® series from Air Products), ethoxylated primary alcohols (e.g. Neodol® series from Shell) and secondary alcohols (e.g. Tergitol® series from Union Carbide), Pluronic® block copolymer surfactants, sulfosuccinates (e.g. Aerosol® series from Cytec), organosilicones (e.g. Silwet® series from Witco) and fluoro surfactants (e.g. Zonyl® series from DuPont). Amphoteric surfactants that, within a certain pH range, are cationic may also be used. In this case the pH of the liquid composition must be adjusted below the isoelectric point of the surfactant. Some examples of useful zwitterionic surfactants include N,N-dimethyl-N-tetradecyl amine oxide (NTAO), N,N-dimethyl N-hexadecyl amine oxide (NHAO) and related amine oxide compounds. Another example is N-dodecyl-N,N-dimethyl glycine. Yet other examples include phosphates, phosphites, phosphonates, lecithins and the like, and phosphonate esters such as phosphomyelin. Surfactants may be used, typically in the amount of about 0.01 to about 5% and more typically about 0.1 to about 1%, based on the total weight of the fixer ink.

Other ingredients may also be formulated into the fixer ink, to the extent that such other ingredients do not interfere with the stability and jetability of the ink, which may be readily determined by routine experimentation. Such other ingredients are in a general sense well known in the art. Biocides may be used to inhibit growth of microorganisms. Inclusion of sequestering (or cheating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N'''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

The fixer ink can contain compatible polymeric binders which do not "precipitate" or "crash" with the amphoteric polymer fixing agent. Some suitable compatible polymeric binders include, for example, cationic or non-ionic soluble or dispersed polymer(s) based on acrylic, urethane, polyester, polyamide, polyvinyl, polyether, polyamine and cellulosic structures. The soluble polymers may include linear homopolymers or copolymers, block polymers, structured polymers including graft or branched polymers, stars, dendrimers, etc. The dispersed polymers can include latexes, polyurethane dispersions, etc. The polymers may be made by any known process including but not limited to free radical, group transfer, ionic, RAFT, condensation and other types of polymerization. When present, the soluble polymer is advantageously used at levels, based on the total weight of ink, of at least about 0.3% and typically at least about 0.6%. Upper limits are dictated by ink viscosity or other physical limitations. In a more typical embodiment, no more than about 15% soluble polymer is present in the ink, and even most typically no more than about 12%, based on the total weight of the ink.

Ink Set and Ink Properties:

The term "ink set" refers to all the individual inks or other fluids, for example, the fixer ink of this disclosure. An ink jet printer is equipped to jet with the inks' physical properties adjusted to the ejecting conditions and print-head design. Ink drop jet velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element, or ejection conditions for a thermal head, for either a drop-on-demand device or a continuous device, and the shape and size of the nozzle.

The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the ink set of this disclosure is particularly suited to lower viscosity applications such as those required by thermal printheads. Thus the viscosity (at 25° C.) of the inks of this disclosure and fixer ink can be less than about 7 cps, is typically less than about 5 cps, and most advantageously is less than about 3.5 cps. Thermal inkjet actuators rely on instantaneous heating/bubble formation to eject ink drops and this mechanism of drop formation generally requires inks of lower viscosity.

In one typical embodiment, the ink set comprises the fixer ink and at least two differently colored inkjet inks More typically, ink sets comprise the fixer ink and at least three differently colored inks (such as CMY), and still more typically the fixer ink and at least four differently colored inks (such as CMYK).

In addition to the CMYK inks mentioned above, the ink sets may contain additional differently colored inks, as well as different strength versions of the CMYK and other inks For example, the inks sets of the present disclosure can comprise full-strength versions of one or more of the inks in the ink set, as well as "light" versions thereof.

Additional colors for the inkjet ink set may include, for example, white, orange, violet, green, red and/or blue.

In a specific embodiment of the present disclosure, there is provided an ink set comprising an ink comprising an ISD (Ionic Stabilized Dispersant) based pigment ink and the fixer ink of the disclosure. In another embodiment, an ink set comprises plural, differently colored ISD based pigment inks and a fixer ink.

The fixer ink will typically be deposited on the substrate before the ink, and typically substantially only in areas subsequently printed with colored ink. The area covered by the fixer (area fill) need not, however, entirely fill the area printed with colored ink. Also, the ink need not fall (entirely) on top of the fixer. The area fill of unprinted fixer can be, and typically is, substantially less than the area fill of overprinted ink. The need for only a small amount of fixer area fill is highly advantageous as this decreases the liquid load the substrate must handle. High liquid load can result in cockle or curl of paper substrate.

Typically, the fixing ink is applied at an area fill of less than about 60% of the area fill of the first ink, more typically less than about 40% of such area fill, and even more typically less than about 30% of such area fill.

Substrate

The instant disclosure is particularly advantageous for printing on porous substrates, and in particular plain paper such as common electrophotographic copier paper. This disclosure can also be useful for printing on textiles.

This disclosure now will be further illustrated, but not limited, by the following examples.

EXAMPLES

Ingredients and Abbreviations

Liponic™ EG-1—ethoxylated glycerin humectant from Lipo Chemicals Inc. (Patterson, N.J.)
Surfynol® 465—a nonionic surfactant from Air Products (Allentown, Pa.)
Zonyl® FSN—a nonionic surfactant from DuPont (Wilmington, Del.)
Proxel® GXL—a biocide from Avecia (Wilmington, Del.)
PAS-84—Amphoteric polymer water solution, quaternary amine maleic acid sulfur dioxide copolymer, solid %=30 wt %, molecular weight=23,000, from Nittobo Boseki Co. (Tokyo, Japan).

Polymeric Dispersants:

The polymeric dispersant was prepared by group transfer polymerization (GTP), although other types of polymerization processes can be used to generate similar types of polymer.

Standard laboratory techniques were employed for the following examples.

The acid value was determined by titration and was reported as meq/gram of polymer solids. Molecular weight was determined by GPC. The GPC separations were carried out using a four-column set consisting of two 500-Å, and two 100-Å 30 cm×7.8 mm i.d. Microstyragel columns (Waters, Milford, Mass.). The THF mobile phase was delivered by a Hewlett-Packard (Palo Alto, Calif.) model 1090 gradient liquid chromatograph at a flowrate of 1.0 mL/min. The eluting species were detected using a Hewlett-Packard 1047A differential refractive detector. Narrow low-molecular-weight poly (methylmethacrylate) standards were used as calibrants. The particle size was determined by dynamic light scattering using a Microtrac Analyzer, Largo, Fla. For many of the dispersion steps, a Model 100 F or Y, Microfluidics System was used (Newton Mass.).

It should be noted that, in referring to the polymer compositions, a double slash indicates a separation between blocks, and a single slash indicates a random copolymer. Thus, for example, BZMA/MAA 90/10 is a random copolymer having about 90 wt % benzyl methacrylate (BZMA) and about 10 wt % methacrylic acid (MAA) units in the final polymer.

Polymer Dispersant Stage 1a: BZMA/MAA 90/10 Random Linear Copolymer (Polymer 1a)

To a 5-liter flask equipped with a mechanical stirrer, thermometer, $N_2$ inlet, drying tube outlet, and several addition funnels were added THF (1715.1 g) followed by catalyst tetrabutyl ammonium m-chlorobenzoate (1.2 ml of a 1.0 M solution in acetonitrile). An initiator 1-methoxy-1-trimethyl-siloxy-2-methyl propene (51.33 g, 0.295 moles) was added via injection. Feed I (tetrabutyl ammonium m-chlorobenzoate, 1.2 ml of a 1.0 M solution in acetonitrile and THF, 10.0 g) was started and added over 180 minutes. Feed II (trimethylsilyl methacrylate, 267.6 g (1.69 moles) and benzyl methacrylate (BZMA), 1305.6 g (7.42 moles)) was started at 0.0 minutes and added over 70 minutes. At 173 minutes, 60.5 g of methanol were added to the above solution and distillation begun. During the first stage of distillation, 503.0 g of material were removed to provide Polymer 1a as a solution with 51.5% of solids.

Polymer 1a had a composition of BZMA/MAA 90/10; molecular weight (Mn) of 5048; and an acid value of 1.24 (meq/gram of polymer solids) based on total solids.

Polymer Dispersant Stage 1b: BZMA/MAA 90/10 Random Linear Copolymer with 2-pyrrolidone as Final Solvent (Polymer 1b)

To a 2 liter flask was added 1000 g of Polymer 1a solution. The resulting mixture was heated to reflux, and 284 g of solvent were removed by distillation. To the flask was added 2-pyrrolidone (221 g), and another 156 g of solvent were removed by distillation. To the flask was added additional 2-pyrrolidone (266 g) to provide Polymer 1b as a polymer solution having 47% of solids.

Dispersion Preparation—Black Dispersion (PD1)

An aqueous black pigment dispersion was prepared by mixing the following ingredients with adequate stirring:

| INGREDIENT | AMOUNT (G) |
| --- | --- |
| Polymer 1b | 268.3 |
| Potassium hydroxide (4.5% solids) | 239.4 |
| Deionized water | 1142 |
| Carbon black (FW-18 Degussa) | 330 |
| Triethyleneglycol monobutyl ether | 220 |

These ingredients were thoroughly mixed and dispersed with a Microfluidics System to yield a dispersion having 15 wt % of pigment solids. The dispersion was then purified by removing excess solvents through an ultrafiltration process to yield a dispersion having 9.86 wt % of pigment solids and less than 1.0 wt % of solvent (other than water). The average particle size of the dispersion is 107 nm.

Inkjet Ink Preparation (Ink A):

An Ink was prepared by mixing the following ingredients with adequate stirring:

| INGREDIENT | AMOUNT (G) |
| --- | --- |
| PD1 | 30.4 |
| 1,2-hexanediol | 4 |
| Glycerol | 10 |
| Ethylene glycol | 5 |
| Liponic ™ EG-1 | 5 |
| Surfynol ® 465 | 0.5 |
| Proxel ® GXL | 0.2 |
| Deionized water | 44.9 |

This made an ink that contained 3.0 wt % pigment.

Fixer Ink Preparation:

Fixer inks were prepared by mixing the ingredients listed in Table 1 with adequate stirring. Weight percentage was based on solid weight of the ingredient. The pH of Fixer-4 was adjusted with nitric acid to around 4.5. The pH of Fixer-5 and Fixer-6 was also adjusted to around 4.5, but with hydrochloric acid.

TABLE 1

Fixer Ink Formulation

| Ingredients (wt %) | Fixer-1 | Fixer-2 | Fixer-3 | Fixer-4 (comp. 1) | Fixer-5 (comp. 2) | Fixer-6 (comp. 3) |
| --- | --- | --- | --- | --- | --- | --- |
| PAS-84 (100% in solids) | 5.0% | 5.0% | 5.0% | | | |
| 4-methylmorpholine-oxide | 4.0% | 4.0% | 4.0% | 4.0% | 4.0% | 4.0% |
| Calcium nitrate | | | | 4.0% | | |
| Calcium chloride | | | | | 4.0% | |
| Magnesium chloride | | | | | | 4.0% |
| Liponic ™ EG-1 | 4.5% | 4.5% | — | — | 4.5% | 4.5% |
| 2-pyrrolidone | 4.0% | 4.0% | — | — | | 4.0% |
| 1,5 Pentanediol | 5.0% | 5.0% | — | — | 5.0% | 5.0% |
| Ethylene Glycol | 4.0% | 4.0% | — | — | 4.0% | 4.0% |
| Tetraethylene glycol | — | — | — | — | — | — |
| Trimethyolpropane | — | — | 8.0% | 8.0% | — | — |
| Surfynol ® 465 | 0.3% | 0.9% | 0.9% | 0.9% | 0.3% | 0.3% |
| Zonyl ® FSN | — | 0.1% | 0.1% | 0.1% | — | — |
| DI Water (balance to 100%) | Balance | Balance | Balance | Balance | Balance | Balance |

TABLE 2

Fixer Ink Properties

| | Fixer-1 | Fixer-2 | Fixer-3 | Fixer-4 (comp. 1) | Fixer-5 (comp. 2) | Fixer-6 (comp. 3) |
| --- | --- | --- | --- | --- | --- | --- |
| Viscosity (cps) | 3.39 | 3.52 | 2.49 | 1.96 | 2.28 | 2.36 |
| pH | 4.9 | 4.9 | 4.7 | 4.77 | 4.47 | 4.51 |
| Surface tension (mN/m) | 37 | 25 | 26 | 25 | 35 | 34 |

Fixer Ink Printing and Printability/Jettability Measurement

One pass printing was performed using fixer inks Fixer-1 to Fixer-6 along with Ink A on a printing apparatus consisting of two Canon I-960 inkjet printheads mounted in a fixed position above a rotating drum to which the substrate was attached. The two printheads were aligned to print on the same area of the substrate and were approximately 1 cm apart, producing a printed stripe of the same width. The print condition was set to print the fixer ink from one printhead and immediately followed by printing of Ink A from the second head on top of the freshly printed ("wet") fixer ink. The amount of ink applied was estimated to be about 17 μg/mm$^2$. Different levels of fixer ink coverage were tested. The amount of fixer ink applied varied from 20%, 30%, 50% and 100% relative to the amount of ink applied which corresponded to about 3.4, 5.7, 8.5 and 17 μg/mm$^2$. A test with ink only, no fixer ink ("0% coverage"), was repeated as part of each series of tests with different fixer inks Paper used in the print test was Xerox 4024 (X4024) plain paper. Optical Densities (OD) were measured with a Greytag-Macbeth SpectroEye (Greytag-Macbeth AG, Regensdorf, Switzerland).

To determine printability/jettability of the fixer inks, a thermal ink jet drop ejection reliability test protocol was performed. The weights of fixer ink drops were measured when the fixer ink was fired from a HP45A printhead at a frequency of 12 kHz. The reported reliability is based on the change in the weight of ink drops in the course of firing around 80 million ejections of ink drops. If the decrease in weight of ink drops was greater than 10% after firing around 80 million ejections of ink drops, a rating of "fail" was assigned. If the decrease in weight of ink drops was less than 10% after firing around 80 million ejections of ink drops, a rating of "pass" was assigned. Test results including OD and jettability for Ink A printed along various levels of fixer inks are summarized in Table 3 below.

TABLE 3

Fixer ink OD and jettability rating

| | | OD | | | | Jettability | |
|---|---|---|---|---|---|---|---|
| Fixer | No fixer (0%) | Fixer applied (20%) | Fixer applied (30%) | Fixer applied (50%) | Fixer applied (100%) | Drop weight change(%) | Rating |
| Fixer-1 | 0.94 | 1.31 | 1.42 | 1.48 | 1.53 | 8.8% | Pass |
| Fixer-2 | 0.94 | 1.31 | 1.40 | 1.45 | 1.48 | 6.5% | Pass |
| Fixer-3 | 0.94 | 1.25 | 1.35 | 1.41 | 1.48 | 9% | Pass |
| Fixer-4 (Comp. Fixer Ink) | 0.94 | 1.32 | 1.46 | 1.50 | 1.52 | Can not run test because fixer ink not jettable | Fail |
| Fixer-5 (Comp. Fixer Ink) | 0.94 | 1.32 | 1.48 | 1.51 | 1.52 | Drop weight was zero after only about 20 millon drop ejection | Fail |
| Fixer-6 (Comp. Fixer Ink) | 0.94 | 1.32 | 1.48 | 1.52 | 1.54 | 61.7% | Fail |

As shown in Table 3, all fixer inks Fixer-1 to Fixer-6 demonstrated improved OD when printed along Ink A. The degree of OD improvement increased with increasing amount of fixer ink applied. Printability/reliability tests for the comparative fixer inks Fixer-4, Fixer-5 and Fixer-6, were all rated as "Fail". Fixer inks Fixer-1, Fixer-2 and Fixer-3 comprising amphoteric polymers all had "Pass" rating for printability/reliability tests. The inventive fixer inks Fixer-1, Fixer-2 and Fixer-3 demonstrated an advantage in ink jet reliability as well as an improvement to OD.

What is claimed is:

1. An ink jettable fixer ink comprising a water soluble or water dispersible amphoteric polymer, wherein said amphoteric polymer comprises both a cationic charge and an anionic charge within the same molecule, wherein the mole ratio of cationic charge to anionic charge is greater than 1; wherein said ink jettable fixer ink does not contain a colorant; and wherein said amphoteric polymer forms a water insoluble solid precipitate when mixing with an anionic charged ink jet ink.

2. The ink jettable fixer ink of claim 1, wherein said water soluble or water dispersible amphoteric polymer is selected from the group consisting of an amphoteric vinyl copolymer, an amphoteric polyurethane polymer and mixtures thereof.

3. The ink jettable fixer ink of claim 1, wherein said water soluble or water dispersible amphoteric polymer is prepared by copolymerizing reactants comprising a cationic salt forming group and reactants comprising an anionic salt forming group, and optionally, at least one neutral reactant.

4. The ink jettable fixer ink of claim 3, wherein the ratio of the number of reactants with cationic salt forming groups and the number of reactants with anionic salt forming groups is greater than one.

5. The ink jettable fixer ink of claim 1, wherein said amphoteric polymer has a number average molecular weight ranging from 3,000 to 80,000.

6. The ink jettable fixer ink of claim 1, wherein said amphoteric polymer is treated with a neutralizing agent or quaternizing agent.

7. The ink jettable fixer ink of claim 1, wherein the amount of amphoteric polymer ranges from about 0.05 to about 20% by weight, based on the total weight of said fixer ink.

8. An ink set comprising an aqueous colorant containing ink jet ink having an anionic charge and an ink jettable fixer ink comprising a water soluble or water dispersible amphoteric polymer, wherein said amphoteric polymer comprises both a cationic charge and an anionic charge within the same molecule, wherein the mole ratio of cationic charge to anionic charge is greater than 1; and wherein said amphoteric polymer forms water insoluble solid precipitate when mixing with an aqueous colorant containing ink jet ink having an anionic charge.

9. The ink set of claim 8, wherein said water soluble or water dispersible amphoteric polymer in said ink jettable fixer ink is selected from the group consisting of an amphoteric vinyl copolymer, an amphoteric polyurethane polymer and mixtures thereof.

10. The ink set of claim 8, wherein said water soluble or water dispersible amphoteric polymer is prepared by copolymerizing reactant(s) comprising a cationic salt forming group and reactant(s) comprising an anionic salt forming group, and optionally, at least one neutral reactant.

11. The ink set of claim 10, wherein the ratio of the number of reactant(s) with cationic salt forming groups and the number of reactant(s) with anionic salt forming groups is greater than one.

12. The ink set of claim 8, wherein said amphoteric polymer has a number average molecular weight ranging from 3,000 to 80,000.

13. The ink set of claim 8, wherein said amphoteric polymer is treated with a neutralizing agent or quaternizing agent.

14. The ink set of claim 8, wherein the amount of amphoteric polymer ranges from 0.05 to 20% by weight, based on the total weight of the fixer ink.

15. The ink set of claim 8, wherein said aqueous colorant containing ink jet ink comprises a colorant and an aqueous vehicle.

16. The ink set of claim 15, wherein said colorant comprises a pigment dispersion, SDP or dye.

17. The ink set of claim 15, wherein said aqueous vehicle comprises water and at least one water soluble organic solvent.

18. A method of ink jet printing onto a substrate comprising, in any workable order, the steps of:
   (a) providing an ink jet printer that is responsive to digital data signals;
   (b) loading said printer with a substrate to be printed;
   (c) loading said printer with an ink set comprising an aqueous colorant containing ink jet ink having an anionic charge and an ink jettable fixer ink comprising a water soluble or water dispersible amphoteric polymer, wherein said amphoteric polymer comprises both a cationic charge and an anionic charge within the same molecule, wherein the mole ratio of cationic charge to anionic charge is greater than 1; and wherein said amphoteric polymer forms water insoluble solid precipitate when mixing with an aqueous colorant containing ink jet ink having an anionic charge; and
   (d) printing onto said substrate using said ink set, in response to said digital data signals to form a printed image on said substrate, wherein said ink jettable fixer ink may be applied to said substrate before or after the application of said aqueous colorant containing ink jet ink.

19. The method of claim 18, wherein said ink jettable fixer ink is applied before said aqueous colorant containing ink jet ink having an anionic charge.

20. The method of claim 18, wherein the volume of ink jettable fixer ink and aqueous colorant containing ink jet ink having an anionic charge is the same or less.

21. The method of claim 18, wherein said substrate is paper.

* * * * *